(12) United States Patent
Vollmer et al.

(10) Patent No.: US 8,424,282 B2
(45) Date of Patent: Apr. 23, 2013

(54) COMBINED-CYCLE POWER PLANT WITH EXHAUST GAS RECYCLING AND $CO_2$ SEPARATION, AND METHOD FOR OPERATING A COMBINED CYCLE POWER PLANT

(75) Inventors: Michael Vollmer, Lampertheim (DE); Camille Pedretti, Birmenstorf (CH); Tobias Kjellberg, Brugg (CH)

(73) Assignee: ALSTOM Technology Ltd., Baden (CH)

( * ) Notice: Subject to any disclaimer, the term of this patent is extended or adjusted under 35 U.S.C. 154(b) by 687 days.

(21) Appl. No.: 12/271,137

(22) Filed: Nov. 14, 2008

(65) Prior Publication Data

US 2009/0145127 A1     Jun. 11, 2009

(30) Foreign Application Priority Data

Dec. 6, 2007   (CH) .................................. 1889/07

(51) Int. Cl.
  *F01K 23/10*   (2006.01)
  *F02C 6/18*    (2006.01)
(52) U.S. Cl.
  USPC .......... 60/39.52; 60/39.5; 60/39.281; 60/783; 122/7 R; 122/7 B
(58) Field of Classification Search .............. 60/783, 60/39.52, 39.5, 39.182, 39.181, 39.512, 772, 60/39.281; 122/7 R, 7 B
  See application file for complete search history.

(56) References Cited

U.S. PATENT DOCUMENTS

| 3,703,807 | A | * | 11/1972 | Rice ........................... 60/39.182 |
| 4,899,544 | A |   | 2/1990  | Boyd |
| 5,724,805 | A | * | 3/1998  | Golomb et al. .................. 60/783 |
| 6,200,128 | B1 | * | 3/2001 | Kobayashi ........................ 431/5 |
| 6,298,655 | B1 | * | 10/2001 | Lee et al. .................... 60/39.182 |

(Continued)

FOREIGN PATENT DOCUMENTS

| DE |     10297365 T5 | 2/2005 |
| DE | 102005015151 A1 | 10/2006 |

(Continued)

OTHER PUBLICATIONS

Search Report in CH 1887/2007, dated Dec. 28, 2007.

*Primary Examiner* — William H Rodriguez
*Assistant Examiner* — Steven Sutherland
(74) *Attorney, Agent, or Firm* — Cermak Nakajima LLP; Adam J. Cermak (57) ABSTRACT

A combined cycle power plant (10) has a gas turbine (11), a heat recovery steam generator (16) which is connected downstream to the gas turbine (11) and delivers steam to a steam turbine (19), an exhaust gas recycling line (28) which returns some of the exhaust gases, which flow from the exhaust of the gas turbine (11) through the heat recovery steam generator (16), to the inlet of the gas turbine (11), and also a $CO_2$ separating plant (25) which separates from the non-returned part of the exhaust gases the $CO_2$ which is contained therein and delivers it to a $CO_2$ outlet. A reduction of the equipment cost or a flexible adaptation of the operation can be achieved by a supplementary firing (17) being associated with the heat recovery steam generator (16), which by combusting a carbonaceous fuel produces additional exhaust gases with $CO_2$ content and transmits them through the heat recovery steam generator (16).

10 Claims, 6 Drawing Sheets

U.S. PATENT DOCUMENTS

| | | | |
|---|---|---|---|
| 6,442,924 B1 * | 9/2002 | Talley et al. | 60/783 |
| 6,910,335 B2 * | 6/2005 | Viteri et al. | 60/786 |
| 2002/0023423 A1 | 2/2002 | Viteri et al. | |
| 2005/0056001 A1 * | 3/2005 | Frutschi et al. | 60/39.182 |

FOREIGN PATENT DOCUMENTS

| | | |
|---|---|---|
| EP | 1429000 A1 | 6/2004 |
| EP | 1752616 A2 | 2/2007 |
| WO | 2004/072443 A1 | 8/2004 |

* cited by examiner

COMBINED-CYCLE POWER PLANT WITH EXHAUST GAS RECYCLING AND CO₂ SEPARATION, AND METHOD FOR OPERATING A COMBINED CYCLE POWER PLANT

This application claims priority under 35 U.S.C. §119 to Swiss application no. 01889/07, filed 6 Dec. 2007, the entirety of which is incorporated by reference herein.

BACKGROUND

1. Field of Endeavor

The present invention refers to the field of power generation. It relates to a combined cycle power plant and to a method for operating a combined cycle power plant.

2. Brief Description of the Related Art

The comparatively low $CO_2$ content in the exhaust gas of a gas turbine is disadvantageous if it involves the separation of $CO_2$ from the exhaust gas. It is known from the prior art (see for example publications EP-A2-1 752 616 or DE-T5-102 97 365), in combined cycle power plants with heat recovery steam generators, to return exhaust gases which come from the gas turbine to the inlet of the gas turbine, after flowing through the heat recovery steam generator, in order to both increase the $CO_2$ content and to reduce the mass flow which has to be processed in the devices for $CO_2$ separation. At the outlet of the heat recovery steam generator the exhaust gas has a temperature of approximately 100° C. which then has to be reduced to 50° C. or less for the separation of the $CO_2$.

Figure 1:
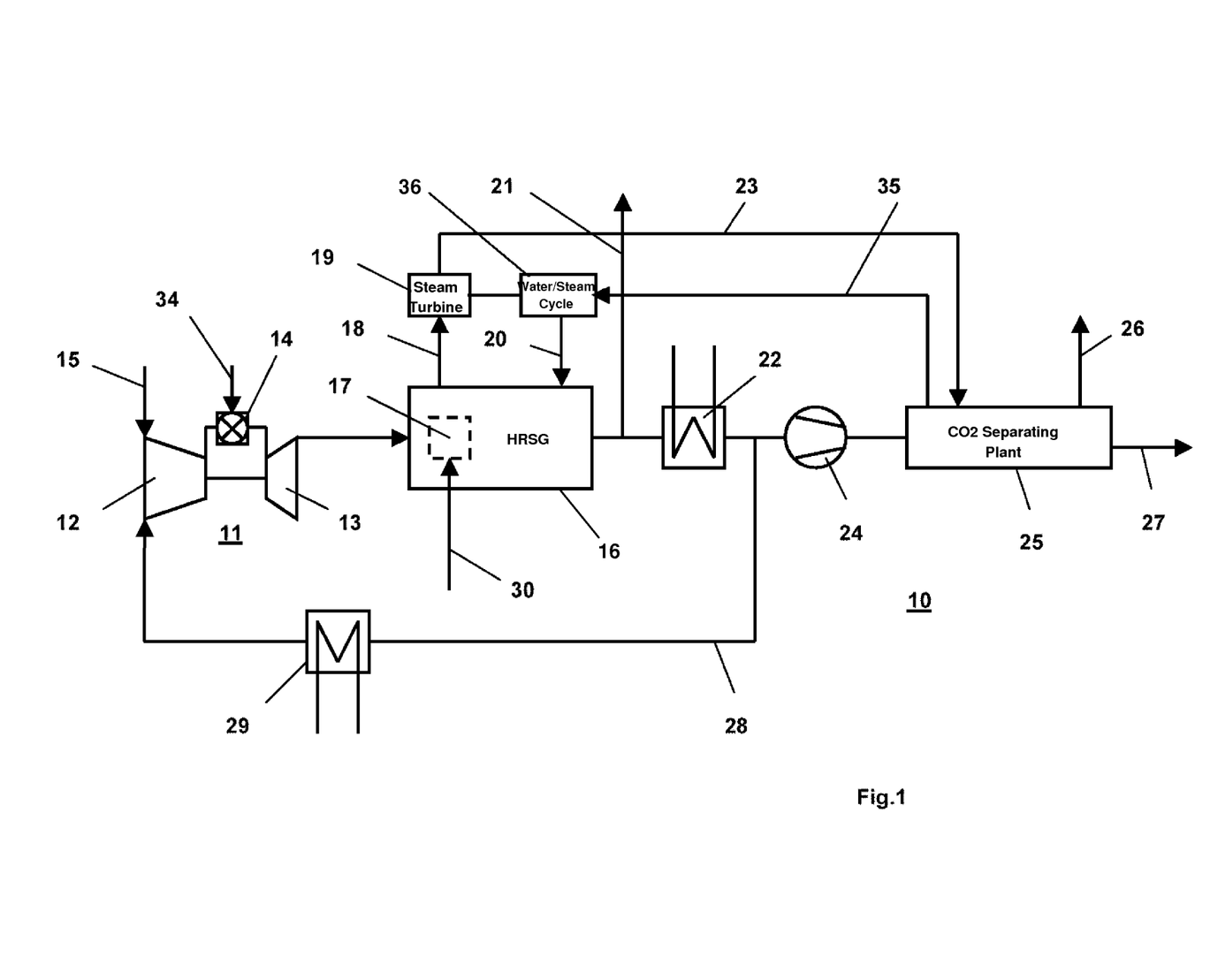
FIG. 1 shows in a much simplified layout plan a combined cycle power plant with supplementary firing according to a first exemplary embodiment of the invention.
Figure 1A:
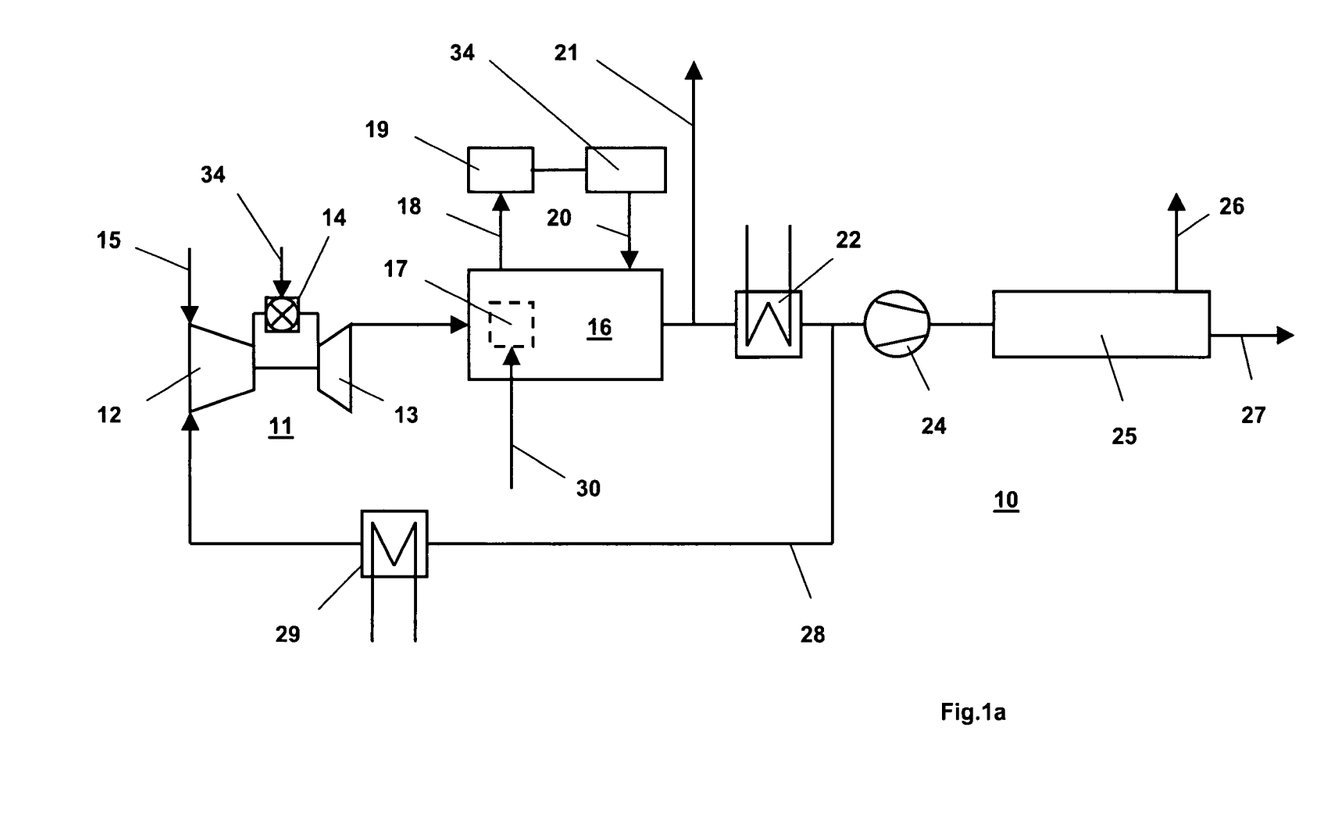
FIG. 1a shows, in a view which is comparable to FIG. 1, a combined cycle power plant with supplementary firing, wherein a $CO_2$ separating plant without steam requirement is used.

The simplest sequential arrangement in principle of the system which is reproduced in FIG. 1 (wherein the supplementary firing 17, which is integrated in the heat recovery steam generator 16, with the fuel feed line 30, has to be imagined as not being included in the system in order to illustrate a prior system, as FIG. 1 illustrates an exemplary embodiment of the present invention) is adequate for a combined cycle power plant with exhaust gas recycling. The combined cycle power plant 10 of FIG. 1 has a gas turbine 11 with a compressor 12, a single-stage or multistage combustion chamber 14 with a corresponding fuel feed line 34, and a turbine 13, and also a heat recovery steam generator 16 which is connected downstream and converts feed water which is fed via a feed-water inlet into steam which flows via one or more live steam outlets 18 to a steam turbine 19. Air is drawn in by the compressor 12 via the air inlet 15 and compressed. With the compressed air, the gaseous and/or liquid fuel, which is fed via a fuel feed line 34, is combusted in the combustion chamber 14. The hot exhaust gases are expanded in the turbine 13, performing work, and then guided through the heat recovery steam generator 16 for producing steam for the associated water/steam cycle 36. The exhaust gas which discharges from the heat recovery steam generator 16 is cooled in a first heat exchanger 22 and then divided into two flows. The one flow is returned via an exhaust gas recycling line 28 to the inlet of the gas turbine 11 and, in doing so, is cooled down further in a second heat exchanger 29. The other flow is compressed by a compressor 24 and guided to a $CO_2$ separating plant 25 where the $CO_2$ is largely separated from the exhaust gas. The separated $CO_2$ is discharged via a $CO_2$ outlet 27, and the exhaust gas which is largely freed of $CO_2$ is discharged via an exhaust gas line 26. The steam, which is required for the separation, is extracted at the steam turbine 19 or at the heat recovery steam generator 16 and fed to the $CO_2$ separating plant 25 via a steam extraction line 23. The accumulating condensate of the $CO_2$ separating plant 25 is fed again via a condensate return line 35 to the water/steam cycle 36 of the combined plant. For $CO_2$ separating plants 25 without heat requirement the steam extraction line 23, as well as the condensate return line 35, can be dispensed with, as is shown in FIG. 1a.

An exhaust gas bypass 21, via which in specific cases the exhaust gas can be discharged directly to the atmosphere, can be provided between the heat recovery steam generator 16 and the subsequent heat exchanger 22.

In the case of this type of augmented concentration of $CO_2$, the high equipment cost of exhaust gas ducts and heat exchangers which is associated with the recycled exhaust gas flow at a recirculation rate of about 50%, and also the reduction of generated output which is associated with the $CO_2$ separation, is disadvantageous.

SUMMARY

One of numerous aspects of the present invention includes a combined cycle power plant of the above-described type in which the exhaust gas recycling can be reduced without significant losses in $CO_2$ concentration, and at the same time the generated output can be increased, and also a method for operating such a combined cycle power plant.

Another of these numerous aspects includes that a supplementary firing is associated with the heat recovery steam generator, which by combusting a carbonaceous fuel produces additional exhaust gases with $CO_2$ content and transmits the exhaust gases through the heat recovery steam generator. The combination of exhaust gas recirculation or exhaust gas recycling and supplementary firing in this case can be used in two different ways. In the first case, the aim is to increase the generated output with the supplementary firing and to reduce the rate of the recycled exhaust gas. The reduction in this case can go to zero in the extreme case. If a recycling of the exhaust gas is permanently dispensed with, the exhaust gas recycling line which is provided for it can even be omitted. In the second case, a flexible operating concept is achieved, which enables a balance between output and efficiency during the $CO_2$ separation.

Another aspect of a combined cycle power plant embodying principles of the present invention includes that the supplementary firing is integrated into the heat recovery steam generator. As a result of this, an especially compact construction is achieved.

Another aspect includes that the exhaust gases, after discharging from the heat recovery steam generator and before distribution to the exhaust gas recycling line and to the $CO_2$ separating plant, are transmitted through a first heat exchanger. The reduction of the exhaust gas temperature which is achieved as a result ensures an effective separation of the $CO_2$ in the subsequent plant.

It is advantageous for the safe and flexible operation of the entire plant in this case if an exhaust gas bypass branches off between the heat recovery steam generator and the first heat exchanger.

If a second heat exchanger is arranged in the exhaust gas recycling line, the inlet temperature of the gas turbine can be reduced and the output increased.

According to aspect, a compressor for the exhaust gases is arranged upstream of the $CO_2$ separating plant.

If necessary, steam is guided from the steam turbine or from the heat recovery steam generator via a steam extraction line to the $CO_2$ separating plant.

An especially flexible operation is made possible by first means for adjusting the recirculation rate being arranged in the exhaust gas recycling line, which preferably comprises a control valve.

In addition, second means for controlling the supplementary firing can be provided.

One aspect of a method embodying principles of the present invention includes that the portion of recycled exhaust gases is kept at zero.

Another aspect of a method embodying principles of the present invention includes that the portion of recycled exhaust gases and/or the output of the supplementary firing are varied in the opposite sense. In this way, the $CO_2$ concentration in the exhaust gas can be kept constant.

Another aspect includes that, for temporary increase of output of the combined cycle power plant, the portion of recycled exhaust gases is reduced and/or the output of the supplementary firing is increased.

BRIEF DESCRIPTION OF THE DRAWINGS

The invention is to be subsequently explained in more detail based on exemplary embodiments in conjunction with the drawing. In the drawing

FIG. 1b shows, in a view which is comparable to FIG. 1, a combined cycle power plant with supplementary firing, wherein separate cooling in the exhaust gas recycling line is dispensed with;

DETAILED DESCRIPTION OF EXEMPLARY EMBODIMENTS

In FIG. 1, a combined cycle power plant 10 with supplementary firing according to a first exemplary embodiment of the invention is reproduced in a much simplified layout plan. A supplementary firing 17 is integrated in this case in the heat recovery steam generator 16 which is connected downstream to the gas turbine 11, which supplementary firing combusts a carbonaceous fuel which is fed via the fuel feed line 30, reheats the exhaust gas flow which is guided through the heat recovery steam generator 16, and adds to it additional exhaust gas with $CO_2$ content. Without the supplementary firing 17, the exhaust gas discharges from the heat recovery steam generator, for example, at a temperature of 100° C. and is cooled down to 50° C. in the subsequent heat exchanger. Half of the cooled-down exhaust gas flow (recirculation rate of 50%) is then returned via the exhaust gas return line 28 to the inlet of the gas turbine 11 and in doing so is cooled still further to 25° C. in the heat exchanger 29.

As a result of the engaged supplementary firing 17 this situation changes: on account of the higher exhaust gas temperatures, more thermal energy is made available for steam generation. The output of the steam turbine 19 is increased accordingly. On account of the additional $CO_2$ concentration in the exhaust gas the recirculation rate of the exhaust gas can be reduced or in the extreme case even lowered completely to zero. As a result of this, the following advantages ensue:

The reduced recirculation rate of the exhaust gas, or recirculation rate which is lowered completely to zero, necessitates less cooling and lower equipment cost (exhaust gas lines and heat exchangers).

As a result of the supplementary firing, the $CO_2$ concentration can be increased, as a result of which the efficiency during $CO_2$ separation increases.

As a result of the supplementary firing, the internal power loss due to the $CO_2$ separation can be compensated for.

The reduced recirculation rate of the exhaust gas, or recirculation rate which is lowered completely to zero, results in a higher $O_2$ portion in the combustion chamber 14 and in the turbine 13. This alleviates the risks for protective oxide layers and combustion with a low $O_2$ portion.

In the case of the exemplary embodiment of FIG. 1, the recirculation rate and the supplementary firing are firmly predetermined and adjusted. The power plant, therefore, can be correspondingly designed differently especially in terms of the exhaust gas recycling line.

Furthermore, it is conceivable according to FIG. 1a to use a $CO_2$ separating plant 25 without steam requirement in the combined cycle power plant 10 of FIG. 1. The steam extraction line 23 and the condensate return line 35 are then dispensed with.

Figure 1B:
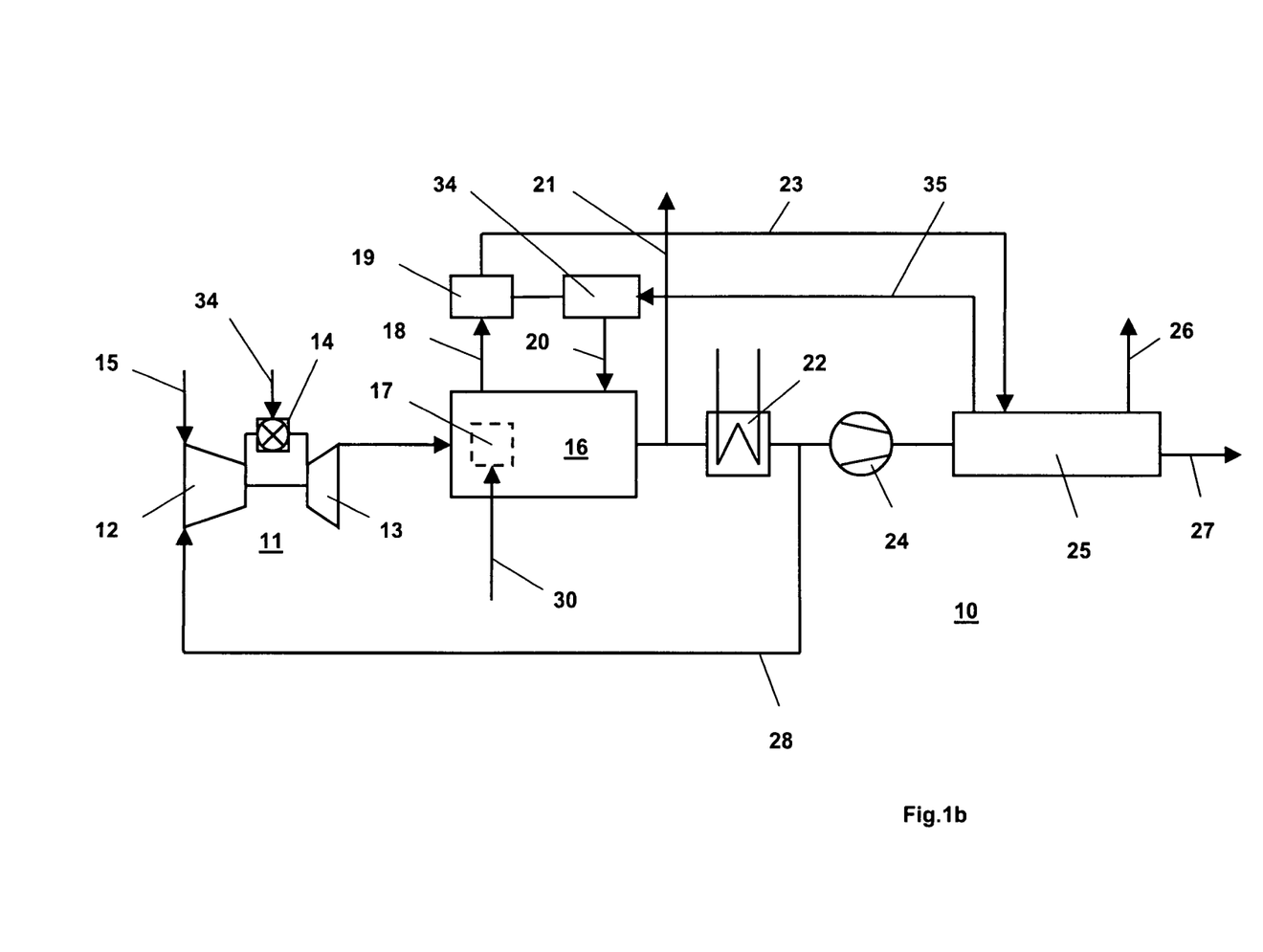

According to FIG. 1b, however, a separate cooler 29 can also be dispensed with in the exhaust gas recycling line 28 of the combined cycle power plant 10, compared with FIG. 1.

Figure 1C:
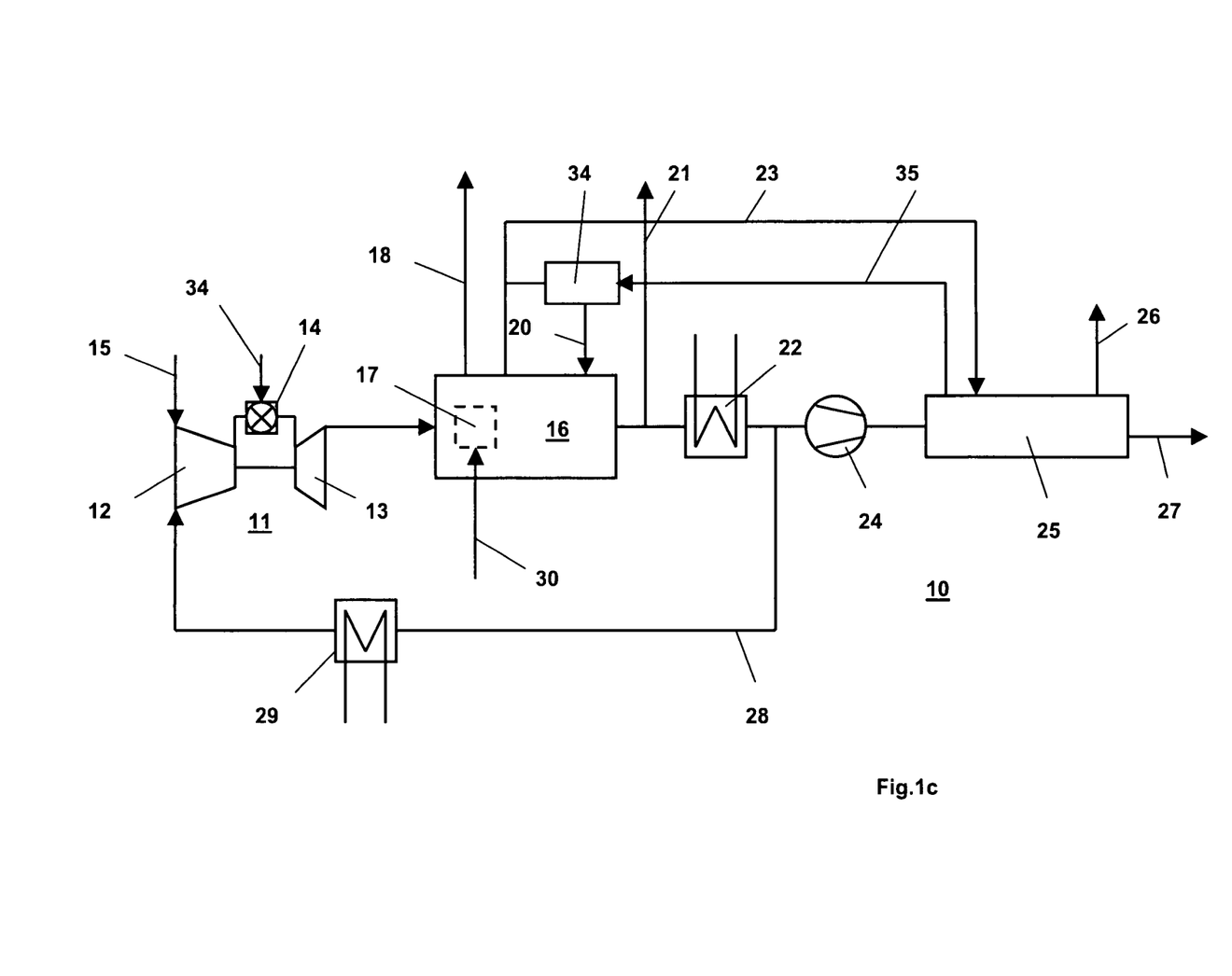
FIG. 1c shows, in a view which is comparable to FIG. 1, a combined cycle power plant with supplementary firing, wherein a steam turbine is dispensed with and the steam is fed for example to an industrial process.

Furthermore, it is possible, according to FIG. 1c, to dispense with the steam turbine 19 in the combined cycle power plant 10 of FIG. 1 and to feed the live steam which is extracted at the live steam outlet 18 to an industrial process or the like.

Figure 1D:
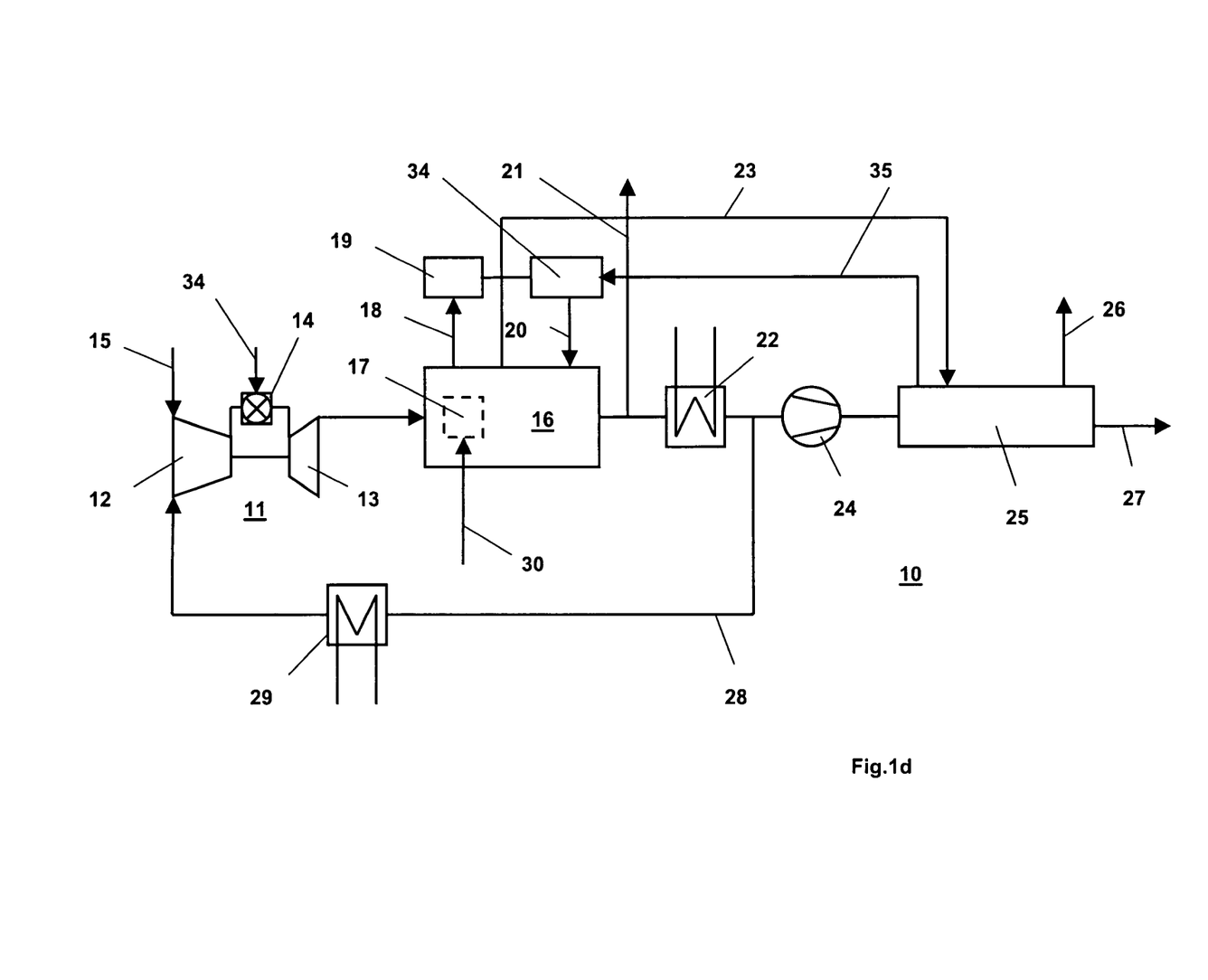
FIG. 1d shows, in a view which is comparable to FIG. 1, a combined cycle power plant with supplementary firing, wherein steam for the $CO_2$ separating plant is extracted directly from the heat recovery steam generator.

The steam for the $CO_2$ separating plant 25 can also be extracted directly from the heat recovery steam generator 16, according to FIG. 1d, instead of from the steam turbine 19.

Figure 2:
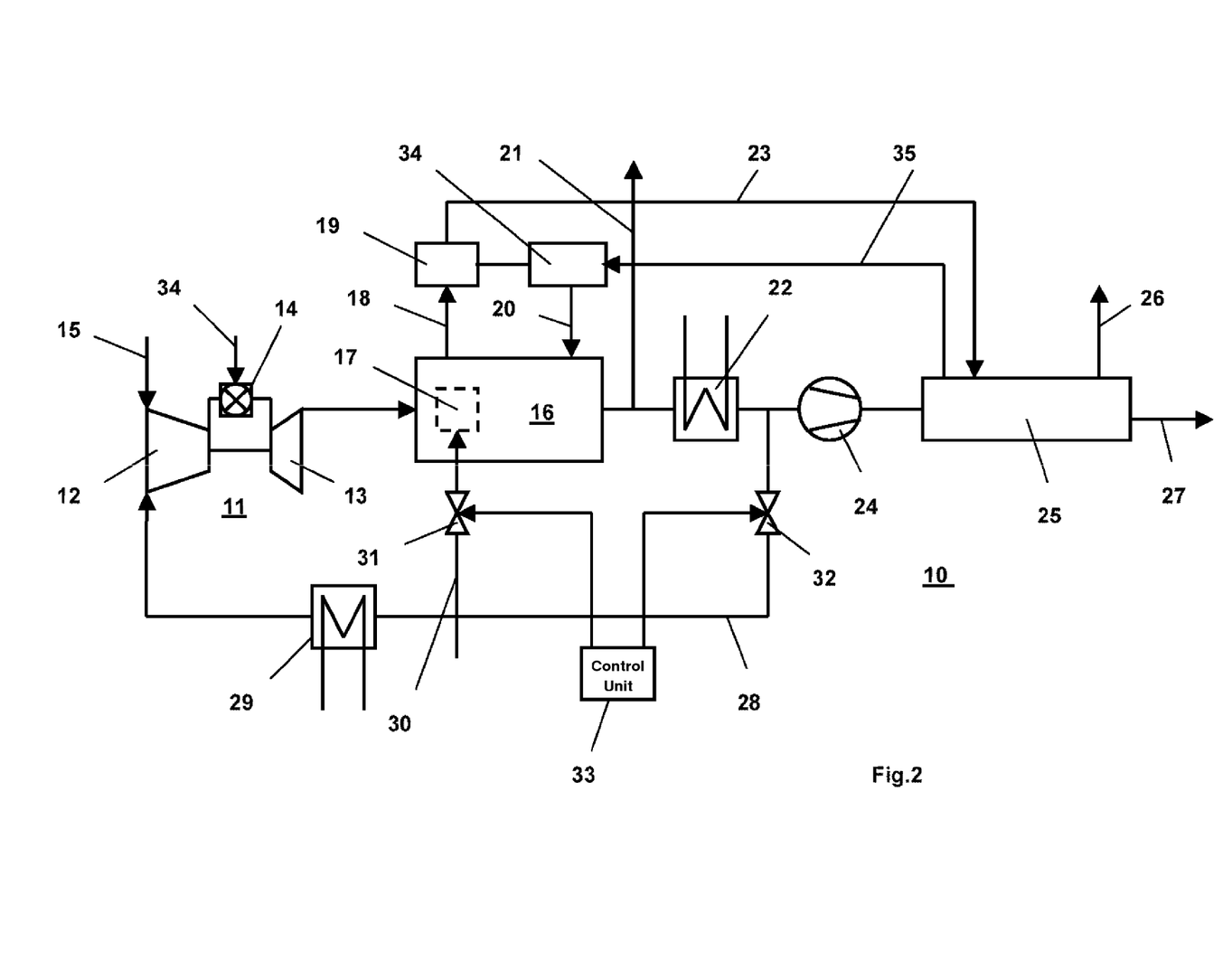
FIG. 2 shows, in a view which is comparable to FIG. 1, a combined cycle power plant with supplementary firing according to a second exemplary embodiment of the invention.

It is also possible, however, to variably design the recirculation rate and the supplementary firing in order to be able to flexibly adapt the operation of the combined cycle power plant to the respectively prevailing boundary conditions. An exemplary embodiment of such a combined cycle power plant with flexibly adapted exhaust gas recycling is shown in FIG. 2. In the case of the combined cycle power plant 10' of FIG. 2, additional device for adjusting the recirculation rate and the supplementary firing 17 are provided compared with FIG. 1 and are exemplarily formed as control valves 31 and 32 in the fuel feed line 30 to the supplementary firing 17 and in the exhaust gas recycling line 28. The control valves 31 and 32 are connected to a control unit 33 which, depending upon requirements, adjusts and controls the recycled exhaust gas flow or the fuel flow to the supplementary firing 17.

The supplementary firing 17 in this case is used for power increase of the power plant in periods with increased demand for electric power by the market. If, on the other hand, the power plant is operated in normal operation with high recirculation rate and without supplementary firing, this enables a very efficient separation of $CO_2$. The recirculation rate in this case is adjusted by the control valve 32.

If (as a result of partial closing of the control valve 32) the recirculation rate is lowered and the supplementary firing 17 is engaged, the generated output of the power plant is increased. The supplementary firing 17 in this case ensures a constant $CO_2$ concentration in the exhaust gas. The separation rate of the $CO_2$ in the $CO_2$ separating plant 25 is nevertheless lowered because the exhaust gas mass flow is increased and more $CO_2$ is produced. The reasons for lowering of $CO_2$ separation rate targets are explained based on the example of a solvent-based $CO_2$ separation:

1. On account of the greater mass flow, the exhaust gas when flowing through the separating columns has a higher flow velocity so that the time for the reaction of the $CO_2$ is shortened by the solvent.

2. Since the volume of $CO_2$ which can be absorbed in the solvent is limited, there is insufficient solvent to absorb the additional $CO_2$ portion.

In the case of a low recirculation rate, the output increase can still be improved. If the same cooling capacity, at a sufficiently low temperature, is made available, the recycled exhaust gas can be cooled still further. As a result, the inlet temperature of the gas turbine 11 is lowered and the generated output is increased.

As a result of the flexible operation which is described above, the following advantages can be achieved:

The system is flexible and enables a balance between the output power and the efficiency of the $CO_2$ separation.

An output increase can be achieved by an increased output of the steam turbine because more steam is produced.

A further output increase with an increased output of the gas turbine can be achieved on account of the lower inlet temperatures.

LIST OF DESIGNATIONS

10, 10' Combined cycle power plant
11 Gas turbine
12 Compressor
13 Turbine
14 Combustion chamber
15 Air inlet
16 Heat recovery steam generator
17 Supplementary firing
18 Live steam outlet
19 Steam turbine
20 Feed water inlet
21 Exhaust gas bypass
22, 29 Heat exchanger
23 Steam extraction line
24 Compressor
25 $CO_2$ separating plant
26 Exhaust gas line
27 $CO_2$ outlet
28 Exhaust gas recycling line
30, 34 Fuel feed line
31, 32 Control valve
33 Control unit
34 Water/steam cycle
35 Condensate recycling line
36 water/steam cycle While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A combined cycle power plant comprising:
   a gas turbine comprising an air inlet and a compressor configured and arranged to compress air introduced through the air inlet, and an exhaust;
   a steam turbine;
   a heat recovery steam generator connected downstream to the gas turbine and configured and arranged to deliver steam to the steam turbine;
   an exhaust gas recycling line configured and arranged to return a portion of the exhaust gases, which flow from the gas turbine exhaust through the heat recovery steam generator, to the gas turbine inlet;
   an exhaust gas control device in the gas recycling line, configured and arranged to adjust said portion of the exhaust gases;
   a $CO_2$ separating plant having a $CO_2$ outlet and having an inlet in fluid communication with the gas turbine exhaust, the $CO_2$ separating plant configured and arranged to separate $CO_2$ from a non-returned part of the gas turbine exhaust gases and deliver said $CO_2$ to the $CO_2$ outlet;
   a supplementary firing device integrated in the heat recovery steam generator, the supplementary firing device configured and arranged to combust a carbonaceous fuel to produce additional exhaust gases with $CO_2$ content, and to transmit the additional exhaust gases through the heat recovery steam generator;
   a fuel line leading to the supplementary firing device;
   a fuel control device in the fuel line to the supplementary firing device; and
   a controller in communication with both the fuel control device and the exhaust gas control device, the controller being configured and arranged to control the fuel control device to control the fuel flow to the supplementary firing device, and to control the exhaust gas control device to control said portion of the exhaust gases, such that the $CO_2$ content in gas admitted to the gas turbine inlet is maintained constant upon an increase in firing of the supplementary firing device.

2. The combined cycle power plant as claimed in claim 1, further comprising:
   a first heat exchanger configured and arranged to exchange heat with exhaust gases after discharging from the heat recovery steam generator and before distribution to the exhaust gas recycling line and to the $CO_2$ separating plant.

3. The combined cycle power plant as claimed in claim 2, further comprising:
   an exhaust gas bypass branching off between the heat recovery steam generator and the first heat exchanger.

4. The combined cycle power plant as claimed in claim 2, further comprising:
   a second heat exchanger arranged in the exhaust gas recycling line.

5. The combined cycle power plant as claimed in claim 1, further comprising:
   a compressor for the exhaust gases arranged upstream of the $CO_2$ separating plant.

6. The combined cycle power plant as claimed in claim 1, further comprising:

a steam extraction line configured and arranged to guide steam from the steam turbine or from the heat recovery steam generator to the $CO_2$ separating plant.

7. The combined cycle power plant as claimed in claim 1, wherein the exhaust gas control device comprises a control valve and the fuel control device comprises a control valve.

8. A method for operating a combined cycle power plant, the method comprising:
   providing a combined cycle power plant as claimed in claim 1; and
   varying the portion of the returned exhaust gases, the output of the supplementary firing device, or both.

9. The method as claimed in claim 8, wherein varying comprises varying the portion of the returned exhaust gases, the output of the supplementary firing, or both, oppositely.

10. The method as claimed in claim 8, wherein, for temporary increase of the output of the combined cycle power plant, varying comprises:
   reducing the portion of the returned exhaust gases; or
   increasing the output of the supplementary firing device; or both.

* * * * *